3,109,144
MICROWAVE MIXERS
Grant O. Heninger, Saratoga, and Edwin S. Oxner, Menlo Park, Calif., assignors to Varian Associates, Palo Alto, Calif., a corporation of California
Filed May 1, 1961, Ser. No. 106,696
5 Claims. (Cl. 325—446)

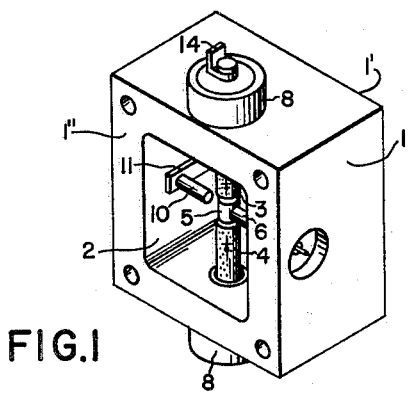
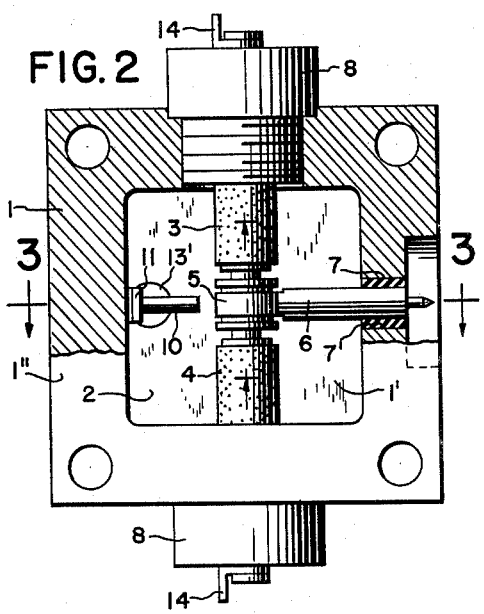
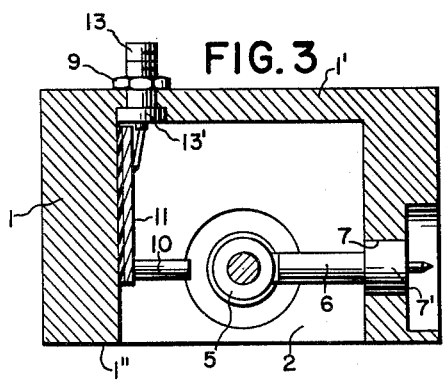
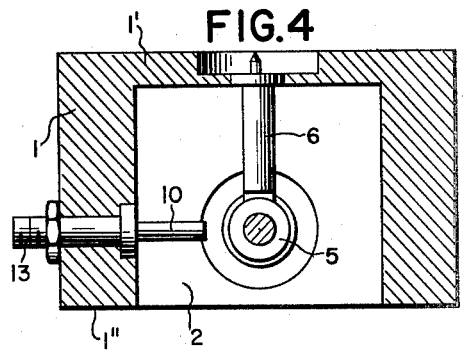
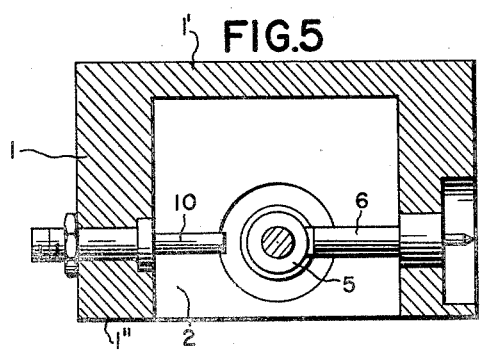
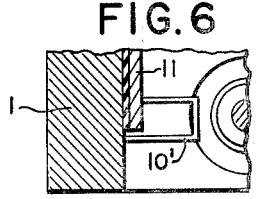
INVENTORS
GRANT O. HENINGER
EDWIN S. OXNER

The present invention relates in general to waveguide hybrid junctions embodied in such microwave components as power dividers, duplexers, mixers, modulators and parametric devices, and more particularly to novel waveguide hybrid junction structures adapted for use with coaxial line couplings.

In U.S. Patent 3,066,290, there is disclosed and claimed a class of extremely compact and lightweight balanced hybrid junctions comprising a section of prismatic waveguide (for example, rectangular or circular) capable of supporting two orthogonal waveguide modes established by the waves propagated through two of the junction connections, said waveguide section being provided with a structure which perturbs one of said modes so that the two modes are in-phase in the third junction connection and out-of-phase in the fourth junction connection thereby providing a broadband balanced coupling to said third and fourth connections. For example, in a microwave mixer, a signal wave may be applied through the first connection, a local oscillator wave applied to said second connection, and a pair of diode rectifiers serve as said third and fourth connections, whereby the signals in said rectifiers are combined to provide a balanced beat frequency output.

It has heretofore been the usual practice to supply the input frequency from a local oscillator into the waveguide section through a rectangular waveguide excited in the proper mode and to supply the signal input into the single waveguide section through a rectangular waveguide in the proper mode from the opposite side of the single waveguide section such that the fields within the single waveguide section would be mutually perpendicular and orthogonal. Structures of this type are limited in that inputs from the local oscillator and the signal are coupled into the single waveguide section through the media of rectangular waveguides which are rigid, inflexible and often include space requirements which can be eliminated through the use of coaxial cables.

It is the principal object of the present invention to provide a compact waveguide hybrid junction structure adapted for use with coaxial line couplings.

One feature of the present invention is the provision of a balanced microwave mixer comprising a single waveguide section having a pair of collinearly disposed crystal diodes communicating therewith, and an antenna-probe projecting from the wall of said waveguide symmetrical with respect to said diodes whereby said probe may be excited through a coaxial line to couple energy to each diode in phase opposition.

Another feature of the present invention is the provision of a balanced mixer of the above featured type wherein said waveguide section supports orthogonal modes, said probe serving to establish a mode which is polarized perpendicular to the axes of said diodes.

These and other features and advantages of the present invention will become more apparent after a perusal of the following specification taken in connection with the accompanying drawings wherein, FIG. 1 is an isometric view of a waveguide hybrid junction constructed in accordance with the principles of the present invention, FIG. 2 is a front view, partly broken away, of the waveguide hybrid junction of FIG. 1 looking into the signal waveguide port, FIG. 3 is a view of the waveguide hybrid junction of FIG. 2 taken along lines 3—3 in the direction of the arrows, and FIGS. 4 and 5 are views of alternative embodiments of the structure shown in FIG. 3.

FIG. 6 is a fragmentary view of an alternative embodiment of the structure shown in FIG. 3.

Referring now to FIGS. 1, 2 and 3 there is shown a waveguide hybrid junction, as, for example, a microwave mixer, in accordance with the present invention. In particular, the mixer comprises a rectangular metallic waveguide section 1 having an end wall 1', said waveguide section and end wall 1' forming a mixer cavity 2. Vertically positioned within mixer cavity 2 are of pair of collinearly disposed crystal diode rectifiers 3 and 4 connected in series by connector 5, connecting the oppositely-poled, inwardly extending terminals of the diode rectifiers 3 and 4. A pair of removable caps 8, threaded through the top and bottom walls of waveguide section 1 support diode rectifiers 3 and 4 within mixer cavity 2. Extending horizontally from connector 5 is an output post 6 for coupling the output I.F. (intermediate frequency) signal out of the mixer cavity 2 through an aperture 7 in a side wall of mixer 1. Output post 6 is insulated from the wall of waveguide section 1 by insulator 7'. An antenna-probe 10 is positioned at one wall of the wave-guide section 1 extending inwardly into mixer cavity 2 for providing an input from a L.O. (local oscillator) into the mixer by way of coaxial input 13 and a microwave transmission line 11 positioned along and insulated from the inner wall of the mixer. Coaxial input 13 is supported within the end wall 1' of the mixer by a flanged portion 13' which is seated within the end wall 1' and a cap nut 9, threaded onto the external portion of coaxial input 13 on the outside of mixer 1. The preferred positioning of the probe 10 is axially aligned with and diametrically across from I.F. output post 6.

During operation of the mixer, a signal is coupled into mixer cavity 2 through the intermediary of a rectangular waveguide (not shown) via the opening in the front wall 1" of the mixer. The waveguide will be positioned such that the signal electric field will excite within mixer cavity 2 a dominant electric mode having an E-field parallel to the axes of crystal diodes 3 and 4. The input from the local oscillator is transmitted into the cavity via coaxial input 13 and the single flat conductor microwave transmission line 11 to probe 10 which is positioned perpendicular to diode rectifiers 3 and 4. The L.O. electric field radiates from probe 10 and will excite a dominant electric mode within cavity 2 which is polarized orthogonal to the signal field. This L.O. electric field is perturbed by the I.F. post 6 and L.O. probe 10 such that a portion of the L.O. electric field will couple to each diode rectifier in the opposite direction. The difference between the currents in the separate diode rectifiers flows along the conductor 6 through a low-pass insulating choke (not shown) in the waveguide wall to the inner coaxial conductor of a balanced I.F. beat frequency output line, the current components in the separate crystal rectifiers due to local oscillator noise canceling each other at the junction 5 of post 6. Each cap 8 is provided with a filter network, bypassing the A.C. crystal current components to the grounded mixer so that the D.C. current levels in the crystal rectifier may be monitored at the lugs 14 on caps 8 without producing undesirable leakage fields. To insure optimum maximum local oscillator to signal arm isolation it is desirable to position L.O. probe 10 symmetrical with respect to the diode rectifiers. This arrangement will further assure substantially equal coupling to the diode rectifiers of the L.O. signal. Probe 10 is preferably coaxial with and diametrically opposed to post 6 to insure better coupling with diode rectifiers. It is noted that a coupling loop, if properly oriented, could be substituted for probe 10.

Another embodiment of the present invention is shown at FIG. 4 where probe 10 is coupled directly to the L.O. coaxial input 13 through a side wall of the waveguide section eliminating the need for a microwave transmission line. I.F. output post 6 is coupled out of the mixer cavity 2 through the end wall 1' of mixer 1.

FIG. 5 shows an embodiment where probe 10 is coupled directly to the L.O. coaxial input 13 which is accommodated by an aperture in a side wall of mixer waveguide section 1. As in the mixer of FIG. 1, the I.F. output post is positioned axially with and diametrically opposite from probe 10 for enhanced coupling to the diodes.

Since many changes could be made in the above construction and many apparently widely different embodiments of this invention could be made without departing from the scope thereof, it is intended that all matter contained in the above construction or shown in the accompanying drawings shall be interpreted as illustrative and not in a limiting sense.

FIG. 6 shows an alternate embodiment of the structure of FIG. 3 where an antenna loop 10' is positioned at one wall of waveguide section 1 for providing the input from the L.O. by way of a coaxial input (not shown) and microwave transmission line 11. It is noted that loop 10' could be coupled directly to a coaxial input as shown in FIGS. 4 and 5.

What is claimed is:

1. A waveguide hybrid junction structure comprising:
   a waveguide section capable of supporting a pair of orthogonal waveguide modes;
   means for applying a first signal through a first waveguide wall into the structure, said signal applying means including an antenna-like member fixed at one end on said first wall, the other end being unattached within said structure for establishing one of such waveguide modes so that the electric field of such mode extends in the same direction as the electric field of the orthogonal waveguide mode in a first region, and in an opposite direction in a second region of the waveguide section;
   a pair of detectors collinearly aligned along an axis within the structure, and having a common connection, the axis defined by the detectors being perpendicular to a longitudinal axis defined by said member;
   means for applying a second signal through a second waveguide wall, said first and second walls being orthogonal so that said first and second signals are in phase in the first region and out of phase in the second region of the waveguide section; and
   an output signal conductive post, coupled to a third waveguide wall opposite said first wall and coupled to the common connection of the detectors for directing an output signal out of the junction structure, said output post and said member being axially aligned.

2. A waveguide hybrid junction as in claim 1, wherein the detectors are diodes coupled by oppositely poled electrodes.

3. A waveguide hybrid junction as in claim 1, wherein the second waveguide wall includes an aperture for receiving an input signal.

4. A waveguide hybrid junction structure as in claim 1, wherein said antenna-like member communicates with a coaxial cable input that extends through the waveguide structure by means of a microwave transmission strip that extends along a wall portion of the waveguide structure.

5. A waveguide hybrid junction structure as in claim 2, wherein said antenna-like member comprises a coupling loop symmetrically positioned with respect to said diodes.

References Cited in the file of this patent
UNITED STATES PATENTS

| | | |
|---|---|---|
| 2,550,524 | Braden | Apr. 24, 1951 |
| 2,576,481 | Rodwin | Nov. 27, 1951 |
| 2,605,399 | Pound | July 29, 1952 |
| 2,713,636 | Jenks et al. | July 19, 1955 |
| 2,754,416 | Hope | July 10, 1956 |
| 2,761,061 | Mattern | Aug. 28, 1956 |
| 3,066,290 | Whitehorn | Nov. 27, 1962 |